United States Patent [19]

Chakravarti

[11] Patent Number: 5,128,054

[45] Date of Patent: Jul. 7, 1992

[54] ADHESIVE-ACTIVE POLYESTER YARN

[75] Inventor: Kalidas Chakravarti, Midlothian, Va.

[73] Assignee: Bridgestone/Firestone, Inc., Akron, Ohio

[21] Appl. No.: 636,829

[22] Filed: Jan. 2, 1991

[51] Int. Cl.⁵ .............................................. B32B 27/34
[52] U.S. Cl. ...................................... 252/8.8; 252/8.6; 252/8.9; 427/389.9; 428/375; 428/395
[58] Field of Search ................................. 252/8.8, 8.9

[56] References Cited

U.S. PATENT DOCUMENTS

| | | | |
|---|---|---|---|
| 3,642,518 | 2/1972 | Miki et al. | 156/335 X |
| 3,711,321 | 1/1973 | Hibbert et al. | 117/119.6 |
| 3,730,892 | 5/1973 | Marshall et al. | 252/8.75 |
| 4,054,634 | 10/1977 | Marshall et al. | 427/175 X |
| 4,242,210 | 12/1980 | Reiwert | 252/8.8 |
| 4,348,517 | 9/1982 | Chakravarti | 523/425 |
| 4,418,164 | 11/1983 | Logullo et al. | 523/207 |
| 4,610,919 | 9/1986 | Kent | 428/285 |

Primary Examiner—A. Lionel Clingman
Attorney, Agent, or Firm—Daniel N. Hall

[57] ABSTRACT

A composition and a process for producing adhesive-active polyester yarn comprising coating polyester fibers with an overcoat finish composition. The process relates to applying the finish to the yarn, forming the coated yarn into cords, and treating the cords with a conventional resorcinol-formaldehyde latex (RFL) dip and subsequently embedding adhesive-active yarn into a rubber article. The composition comprises an aziridine (also called an ethylenimine compound) compound, a diluent, and a wetting agent. The special finish application allows the formation of a coated yarn with improved bond strength, and in particular improved bond strength to rubber particles.

7 Claims, No Drawings

ADHESIVE-ACTIVE POLYESTER YARN

FIELD OF INVENTION

The present invention relates to a composition and to a process for making a coated polyester yarn with improved bond strength to rubber. The invention provides an adhesive-active polyester fiber which is safe to handle, provides superior adhesion to rubber, utilizes a single-dip process at standard treating conditions, and does not require any special rubber stock for improved adhesion.

BACKGROUND

Polyester plied yarn or cords require application of adhesive systems to obtain good bonding to rubber articles, such as tires, hoses, and belts, etc. Generally, two types of adhesive systems are used, one process is a single-dip process and the other process is a double-dip adhesive system. A double-dip system typically provides good bonding of polyester yarn to rubber articles. However, a single-dip system is preferred, due to economic and practical considerations. A single-dip system generally requires that the polyester yarn or cord have an adhesive-active material on its surface to allow bonding with a latex dip. The resorcinol-formaldehyde latex (RFL) dip generally is a blend of resorcinol, formaldehyde, and styrene-butadiene-vinylpyridine terpolymer latex.

U.S. Pat. No. 3,642,518, to Miki et al., discloses a treatment for polyester materials to increase adhesion to rubber by contacting the polyester material with a treating liquor containing a silane.

U.S. Pat. No. 3,711,321, to Hibbert et al., discloses a process for producing coated articles, and particularly a rapid drying process for coating cellulosic substrates with coating colors containing polyvinyl alcohol as the pigment binder.

U.S. Pat. No. 3,730,892, to Marshall et al., discloses an improved multi-filament polyethylene terephthalate yarn and process for producing said yarn, said yarn being combined with a compatible fiber finish composition of hexadecyl (isocetyl) stearate, coconut oil or mineral oil; glycerol monooleate; decaglycerol tetraoleate; polyoxyethylene tall oil fatty acid; sulfonated glycerol trioleate; polyoxyethylene tallow amine; 4,4'-thiobis (6-tert-butyl-m-cresol); and a silane.

U.S. Pat. No. 4,054,634, to Marshall et al., discloses a process for producing polyethylene terephthalate yarn, particularly for tire cords, wherein a liquid finish is applied to the yarn, said process involving spinning and drawing steps, the improvement comprising (a) first applying to the yarn prior to said drawing step a liquid finish composition consisting essentially of a polyalkylene glycol composition; and then (b) applying to said yarn after said drawing step a liquid finish composition consisting essentially of about 70-95 parts by weight of said mixed polyoxyethylated-polyoxypropylated monoether, about 5 to 30 parts by weight of a silane, and a sufficient amount of water-soluble alkaline catalyst to adjust the pH of the finish composition to 8 to 10.

U.S. Pat. No. 4,348,517, to Chakravarti, discloses a process and finishing composition for producing adhesive-active polyester yarn. The fiber finish composition comprises a triglycidyl ether of glycerol; a low viscosity diglycidyl ether; ethoxylated castor oil; an epoxy silane; and a solvent.

U.S. Pat. No. 4,610,919, to Kent, discloses a fibrous padding in which the fibers are held together by a binder. The fibrous padding disclosed is capable of R.F. sealing with adhesion to loose-weave knit fabrics which are uncoated with adhesive.

SUMMARY OF INVENTION

According to the present invention, a polyester drawn yarn is coated at room temperature with an overcoat finish composition containing a polyfunctional aziridine and the yarn is then formed into cords. The cords are then treated with a resorcinol-formaldehyde latex dip composition at an elevated temperature. The treated cords can then be embedded and cured in rubber compositions. The present invention shows a significant improvement in yarn to rubber adhesion when compared with yarn having no overcoat finish application.

DETAILED DESCRIPTION

The present invention relates to a composition and to a process for production of polyester yarn with improved bond strength to rubber needed for improved reinforced rubber article preparation. Additional advantages of this invention include cost savings and convenience as compared with a two-dip system.

The yarn of the present invention is typically made of polyester. Any suitable polyester known to the art and to the literature can be utilized.

The polyester can generally be any long chain polymer composed of at least 75 percent by weight of an ester and an acid. Such polyesters are formed by the reaction of a glycol containing from about 2 to about 20 carbon atoms and a dicarboxylic acid component containing at least about 75 percent terephthalic acid. The remainder, if any, of the dicarboxylic acid component may be any suitable dicarboxylic acid having from 5 to about 20 carbon atoms such as sebacic acid, adipic acid, isophthalic acid, sulfonyl-4,4'-dibenzoic acid, or 2,8-dibenzofuran-dicarboxylic acid. Examples of linear terephthalate polyesters which can be utilized include poly(ethylene terephthalate) PET, poly(butylene terephthalate),poly(ethyleneterephthalate/5-chloroisophthalate), poly(ethylene terephthalate/5-sodiumsulfoisophthalate), poly(cyclohexane-1,4-dimethylene terephthalate), and poly(cyclohexane-1,4-dimethylene terephthalate/hexahydroterephthlate), with PET being preferred.

In accordance with conventional practice, the polyester yarn is generally made by melt-spinning the polymer and subsequently applying a conventional spin finish composition known to the art as well as to the literature. The amount of the spin finish composition is generally from about 0.4 to about 1.0 percent by weight and preferably from about 0.5 to about 0.8 percent by weight based upon the total weight of the polyester yarn. The spin finish composition can generally be a fatty acid ester based formulation, a polyether based formulation, a mineral oil composition, or any other suitable spin finish formulation heretofore known to the art and to the literature. Subsequent to the application of the spin finish, the yarn is generally drawn.

In accordance with the present invention, an overcoat finish composition, etc. is applied at room temperature, that is from about 60° F. to about 120° F., as a coating to the treated melt-spun yarn. The essential components of the overcoat finish composition include one or more aziridine (also called ethylenimine compounds) compounds known to the art and to the literature, and as dispersing agents a diluent, and a wetting agent. Examples of various aziridine/urea compounds include: bis-polyethylene urea such as ω, ω'-polymethylene bis-polyethylene urea; or aromatic bis-ethylene urea; or triazine ethylene urea (Formula I); and the like, with about 2 to about 3 aziridine groups in the molecule. Other bis-ethylene ureas can be represented by the following general formula II, where R = NH₂, H, CH₃O, or C₆H₅.

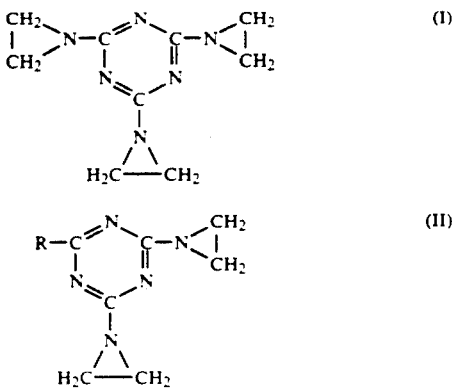

Another aziridine compound has the general formula:

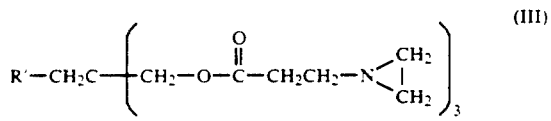

where R' = CH₃ or OH.

Preferred aziridines include pentaerythritol-tris-(β-(N-Aziridinyl)) propionate and trimethylol propane-tris-(β-(N-Aziridinyl)) propionate. Generally, an amount of 2 to 20 percent by weight of polyfunctional aziridine based upon the total weight of the overcoat finish composition with a desirable amount being from about 4 percent to about 10 percent by weight of the weight of the essential overcoat composition, i.e., the aziridine compound, a diluent, and a wetting agent.

The polyfunctional aziridine is typically dispersed in a diluent. The diluent is desirably a polyether alcohol liquid polymer, known to the art and to the literature, or water, or combinations thereof. Although water can be utilized, it is not preferred due to the short shelf life of the overcoat finish composition. The preferred polyether alcohol can have the general formula:

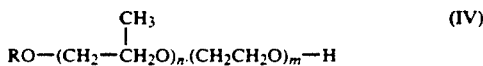

wherein n and m, independently, is from about 2.0 to about 8.0 and preferably from about 2 to about 4, and R is usually a hydrogen atom or an alkyl having from 1 to 8 carbon atoms. The polymer is generally made of ethylene and propylene oxide and is typically linear. The number average molecular weight range of this liquid polymer is generally from about 200 to about 1000, and desirably from about 240 to about 600. The amount of the diluent is generally from about 78 percent to about 96 percent; and desirably from about 80 percent to about 92 percent by weight based upon the total weight of the essential overcoat finish composition.

The third component of the essential overcoat finish composition is a wetting agent. Any wetting agent known to the art and to the literature can be utilized such as phosphate esters, fluoro surfactants, or ethoxylated alcohols. Preferably, the wetting agent is an alkaline metal salt of a sulfated or sulfonated alkyl ester containing a total of from about 8 to about 30 carbon atoms. Hence, specific examples of alkyl esters include the sodium salt of sulfonated succinic acid, and the sodium salt of octyl sulfate. The amount of the wetting agent is generally from about 0.1 percent to about 2 percent by weight and preferably from about 0.5 percent to about 1.5 percent by weight based upon the total weight of the essential overcoat finish composition.

Application of the overcoat finish composition to the yarn can be accomplished by any type of metering device known to the art and to the literature. Specific examples include kiss roll coating a metering finish applicator, spray applicator, and the like. The amount of the overcoat finish composition applied to the yarn is generally from about 2 percent to about 25 percent, desirably from about 4 percent to about 10 percent, and preferably from about 6 percent to about 8 percent (i.e., wet pick-up) based upon the total weight of the yarn. Accordingly, the amount of aziridine level on the yarn is generally between about 0.1 percent and 5.0 percent by weight of yarn, desirably from about 0.2 percent to about 1.0 percent, and preferably from about 0.2 percent to about 0.6 percent by weight of the yarn.

The finish composition can contain other non-essential compounds, however, the pH generally must be alkaline. The range of pH should generally be from about 7.1 to about 11.0, and preferably 8.0 to 9.5.

Once the application of the overcoat finish composition is completed, the yarn is plied or twisted into cords which are then treated with a dip composition. The ply depends on the final application and may be single-ply, 2-ply, 3-ply, or greater. The formation of the cords and the method of plying are well known to the art and to the literature.

The dip composition is generally a latex dip or solution. The dip process allows an adhesive layer to be applied to the overcoat finish composition treated corded yarn to permit bonding to a rubber substrate. Generally, the dip composition is composed of a resorcinol-formaldehyde latex which generally comprises a conventional resorcinol-formaldehyde resin, a base, and water. Conventional resorcinol-formaldehyde resins can be utilized as known to the art and to the literature and the same are described in U.S. Pat. No. 2,128,229; U.S. Pat. No. 2,561,215, etc. and in "Fabric Adhesion and RFL" Adhesive Age, by M. W. Wilson, 4, No. 4, pp. 32-36 (1963), and the same are hereby fully incorporated by reference. The base is generally an inorganic base such as NaOH or NH4OH, and the like. For polyester fiber, usually NH4OH is avoided due to ammonolytic degradation of polyester by NH4OH.

The amount of the resorcinol-formaldehyde resin is from about 8 to about 20 percent, desirably from about 12 to about 20 percent, and preferably from about 14 to about 18 percent by weight based upon the total weight of the latex. The amount of the base is generally from about 2 to about 8 percent by weight based upon the total weight of the latex. The RFL dip is desirably aged from about 8 to about 24 hours before application because hydrolysis is slow, and the RFL mixture becomes uniform and provides better adhesion to fiber after this aging period. The molar ratio of the resorcinol to the formaldehyde of the resin can range from about 0.3 to about 2:0, desirably from about 0.3 to about 0.5.

The amount of dip typically applied varies from about 2 percent to about 10 percent by weight, and desirably from about 4 percent to about 6 percent by weight based upon the total weight of the yarn. Once the dip is applied, the plied yarn or cord is subsequently cured in an oven at an elevated temperature, generally between 300° F. to 470° F., desirably between 360° F. to 470° F., and preferably between 460° F. to 465° F.

Subsequent to the dip treatment, the treated plied yarn or cord is embedded in rubber stock in any conventional manner and cured. The material is subjected to vulcanization at temperatures about 300° F. to about 400° F. and generally under pressure of 2,000 to 3,000 kilopascals. The rubber can generally be any type of a rubber with which polyester yarn as in the form of plies or cords are utilized. Such rubbers are generally well known to the art and to the literature and include natural rubber, synthetic rubber such as those made from conjugated dienes containing from 4 to about 12 carbon atoms, rubbers made from copolymers of conjugated dienes containing from 4 to about 12 carbon atoms with vinyl substituted aromatics containing from about 8 to about 12 carbon atoms, various nitrile rubbers, various EPDM rubbers, chloroprene rubber, and the like. Examples of such rubbers containing polyester plies or cords therein include tires, conveyor belts, hoses, or any other shaped, reinforced rubber article.

The adhesion between the cord and rubber article can tested by any conventional testing method used in the art, as for example ASTM (D2138)37, and (D2630)37.

The following examples serve to illustrate the use of the invention, but do not limit it in any way.

EXAMPLE 1

In example of Table III, a polyethylene terephthalate yarn having 25 carboxyl end groups (milli equivalent/Kg) were spun as 1000 denier, 192 filaments. To the yarn was applied a conventional spin finish oil composition which acted as a lubricant. This yarn had only the lubricating spin finish, and did not contain any overcoat finish composition and was thus used as a control.

This yarn was then twisted into a two-ply cord having 12×12 twists per inch. Each cord was then treated with a conventional non-ammoniated resorcinol-formaldehyde latex dip (RFL) containing vinyl pyridine latex, resorcinol, formaldehyde, sodium hydroxide and water, usually at about 4.5 percent solids pick-up based on the weight of the cord. Here, the treating condition 1 was utilized (see Table II). The cords were then embedded unidirectionally in a rubber stock (referred to as Uniroyal-type rubber received from Uniroyal Rubber Co.) for about 15 minutes at 350° F. and at a pressure of about 2300 kilopascals. The peel adhesion force (lbs. pull of the unidirectional fabric peel force) was measured to be only about 13 lbs. (see Table III). This value thus represents the peel force as well as a visual rating of percent rubber coverage for the control sample with no special overcoats.

EXAMPLES 2-4

The procedure of example 1 was repeated in examples 2, 3, and 4 of Table III with the following changes. The overcoat A was applied in example 2, overcoat B was applied in example 3, and overcoat C was applied in example 4, respectively (see Table I for formulation). The percent wet pick-up of overcoat on the yarn in each case was adjusted such that the aziridine level on yarn is preferably from 0.2 percent to 0.5 percent, based on the yarn weight. The results of adhesion testing (strip adhesion—lbs. pull) and percent rubber coverage are shown in Table III.

EXAMPLES 5-8

In example 5 of Table III, the process of example 1 was repeated except that the RFL-treating condition of 2 as described in Table II was used. The adhesion result of example 5 represents another control yarn value without the overcoats of the present invention.

Example 6 was repeated exactly the same way as that of example 5 except that the yarn contained about 5.0 percent to 8.0 percent level of the overcoat C as wet pick-up (see Table I). The aziridine level on yarn was from 0.25 percent to 0.4 percent by weight of the yarn. The strip adhesion testing is also represented in Table III. Likewise, in examples 7 and 8, the process for example 6 was repeated except that overcoats E and F were applied on the yarn, respectively. In each case, the aziridine level on yarn is maintained at about 0.2 percent to 0.4 percent level by the weight of the yarn. The comparative adhesion results are shown in Table III.

EXAMPLES 9-13

The procedure of example I was repeated in example 9, except that the treating conditions 3 of Table II were utilized. Since no overcoat was used in the case of example 9, this represents another control at the treating condition 3, and the adhesion results of example 9 were compared with the others in examples 10-13.

In examples 10-3, the process for example 9 was repeated except that the overcoats C, D, E, and F, respectively, were utilized. Again, the aziridine level on the sample is maintained at about 0.2 percent to 0.4 percent level. Results of adhesion testing are shown in Table III for comparison with the control (example 9).

EXAMPLES 14 AND 15

Polyethylene terephthalate yarn of 1000 denier, 192 filaments, having only 16 carboxyl end groups, was prepared using the same type of spin finish composition as the above examples. The yarn was then twisted into two-ply cord having 12×12 twists per inch. The twisted cord was treated with the same conventional RFL and treating conditions as in example 9. In example 14, no overcoats were used to prepare the yarn, but in example 15, overcoat D was applied on the yarn such that wet pick-up was between 4 percent to 6 percent level, and the aziridine level on the yarn was about 0.4 percent to 0.6 percent based on the yarn weight. RFL treating condition remained the same as that of example 14 (control). Excellent adhesion improvements for example 15 are shown in Table III.

TABLE I

OVERCOAT FINISH COMPOSITIONS (PERCENT BY WEIGHT)

| COMPONENT | FINISH IDENTIFICATION (PERCENT BY WEIGHT) | | | | | |
|---|---|---|---|---|---|---|
| | A | B | C | D | E | F |
| POE (40)/Castor Oil* | 21 | — | — | — | — | 10 |
| UCON 50 HB55[1] | — | — | 94 | 90 | 94 | 64 |
| UCON 50 HB100[2] | — | 84 | — | — | — | — |
| Sodium Octysulfate **(Desulf SO-LF33) | 1 | — | 1 | 0.5 | 0.5 | — |
| Sodium Dinonyl-Sulfosuccinate | — | 1 | — | — | — | 1 |

TABLE I-continued

OVERCOAT FINISH COMPOSITIONS (PERCENT BY WEIGHT)

| COMPONENT | FINISH IDENTIFICATION (PERCENT BY WEIGHT) | | | | | |
|---|---|---|---|---|---|---|
| | A | B | C | D | E | F |
| **(Nekal WS25) | | | | | | |
| ***XAMA-7 | 5 | — | 5 | 9.5 | 5.5 | 10 |
| ****XAMA-2 | — | 5 | — | — | — | — |
| Water | 73 | 10 | — | — | — | 15 |

*moles of ethylene oxide per mole of castor oil
**Trade names of products from DeForest, Inc. and GAF Corp., respectively
***Trade name for Pentaerythritol-tris-($\beta$-(N-Aziridinyl)) Propionate (Hoechst-Celanese Co.)
****Trade name for Trimethylol propane-tris-($\beta$-(N-Aziridinyl)) Propionate (Hoechst-Celanese Co.)
[1]A diluent of formula No. 1 having a 50:50 mole ratio of ethylene to propylene groups with R being H, and having as ASTM D2270 viscosity index of 97, manufactured by Union Carbide.
[2]A diluent of formula No. 1 having a 50:50 mole ratio of ethylene to propylene groups with R being H, and having an ASTM D2270 viscosity index of 165, manufactured by Union Carbide.

TABLE II

TREATING CONDITIONS WITH SINGLE DIP* SYSTEM

| CONDITION | DRYING OVEN (ZONE 1) | | | CURING OVEN (ZONE 2) | | | CURING OVEN (ZONE 3) | | |
|---|---|---|---|---|---|---|---|---|---|
| | Temp. (°F.) | Exp. (Sec.) | Stretch (%) | Temp. (°F.) | Exp. (Sec.) | Stretch (%) | Temp. (°F.) | Exp. (Sec.) | Stretch (%) |
| 1 | 250° | 60 | +0.5 | 275° | 60 | 0 | 360° | 60 | 0 |
| 2 | 275° | 50 | +5.5 | 465° | 40 | −2.5 | 462° | 50 | 0 |
| 3 | 300° | 75 | +5.5 | 460° | 45 | −2.5 | 460° | 45 | 0 |

*Non-ammoniated resorcinol-formaldehyde latex dip containing vinyl pyridine latex, resorcinol, formaldehyde, sodium hydroxide, and water. The percent solids pick-up of the dip on the cord could be controlled from 3 percent to 5.5 percent level, preferably at 4.5 percent level, based on the weight of the cord.

TABLE III

STRIP ADHESION RESULTS

| EXAMPLE NO. | OVERCOAT (1) DESIGNATION | RFL-TREATING (2) CONDITIONS | COOH-END (3) GROUPS | STRIP ADHESION (4) PULL-FORCE (W/POUNDS) | % RUBBER COVERAGE |
|---|---|---|---|---|---|
| 1 | No Overcoat (Control) | 1 | 25 | 13 | 5 |
| 2 | A | 1 | 25 | 36 | 15 |
| 3 | B | 1 | 25 | 39 | 15 |
| 4 | C | 1 | 25 | 41 | 35 |
| 5 | No Overcoat (Control) | 2 | 25 | 20 | 7 |
| 6 | C | 2 | 25 | 60 | 60 |
| 7 | E | 2 | 25 | 68 | 50 |
| 8 | F | 2 | 25 | 38 | 20 |
| 9 | No Overcoat (Control) | 3 | 25 | 25 | 15 |
| 10 | C | 3 | 25 | 80 | 75 |
| 11 | D | 3 | 25 | 79 | 70 |
| 12 | E | 3 | 25 | 82 | 80 |
| 13 | F | 3 | 25 | 46 | 50 |
| 14 | No Overcoat (Control) | 3 | 16 | 26 | 10 |
| 15 | D | 3 | 16 | 56 | 80 |

F.N.
(1) See Table I for overcoat compositions.
(2) See Table II for RFL treating conditions.
(3) COOH end groups of polyester (in Milli Eq./Kg.).
(4) Strip adhesion force, using Uniroyal strip test at room temperature (also referred to as peel adhesion force). Percent rubber coverage are visual ratings where 100 is full coverage, and 0 is no coverage.

As apparent from the Tables, the overcoat finish composition of the present invention resulted in improved rubber coverage, as well as vastly improved strip adhesion.

While in accordance with the Patent Statutes, the best mode and preferred embodiment has been set forth, the scope of the invention is not limited thereto, but rather by the scope of the attached claims.

What is claimed is:

1. An overcoat finish composition for polyester yarn, the finish composition comprising:
a blend of at least one aziridine compound, and an effective amount of a diluent to disperse said aziridine and an effective amount of a wetting agent to disperse said aziridine, wherein said aziridine is
(A) a bis-polyethyleneurea aziridine, or
(B) an aromatic bis-ethyleneurea aziridine; or
(C) a triazineethyleneurea of the formula—(I) or (II)

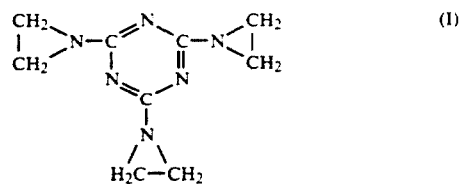

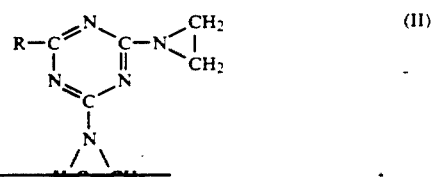

where R=H, $C_6H_5$, $NH_2$, or $CH_3O$; or
(D) or an aziridine compound of the following formula

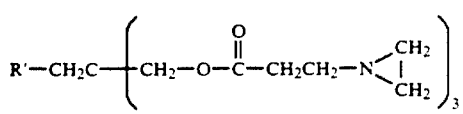

where R'=$CH_3$ or OH.

2. An overcoat finish composition according to claim 1, wherein the amount of said aziridine compound is from about 2 to bout 20 percent by weight, wherein the amount of said diluent is from about 78 to about 96 percent by weight, and wherein the amount of said wetting agent is from about 0.1 percent to about 2 percent by weight, all based upon the total weight of said aziridine composition, said diluent, and said wetting agent.

3. An overcoat finish composition according to claim 2, wherein said diluent is a polyether alcohol.

4. An overcoat finish composition according to claim 3, wherein said aziridine is pentaerythritol-tris-($\beta$-(N-Aziridinyl)) propionate or trimethylol propane-tris-($\beta$-(N-Aziridinyl)) propionate, and wherein said polyether alcohol diluent is $$RO-(CH_2-\underset{\underset{CH_3}{|}}{CH_2O})_n \cdot (CH_2CH_2O)_m-H \qquad (IV)$$

and wherein n and m, independently, is from about 2.0 to about 8.0 and wherein R is hydrogen or an alkyl having from 1 to 8 carbon atoms.

5. An overcoat finish composition according to claim 4, wherein the amount of said aziridine compound is from bout 4 to about 10 percent by weight, and wherein the amount of said wetting agent is from about 0.5 to about 1.0 percent by weight.

6. An overcoat finish composition according to claim 5, wherein the yarn is polyethylene terephthalate.

7. An overcoat finish composition according to claim 5, wherein said wetting agents are alkaline salts of alkyl sulfates or the alkaline salt of sulfonated alkyl esters, wherein said alkyl sulfates or said alkyl esters contain a total of from about 8 to about 30 carbon atoms.

* * * * *